3,193,516
MELT SPINNING PROCESS

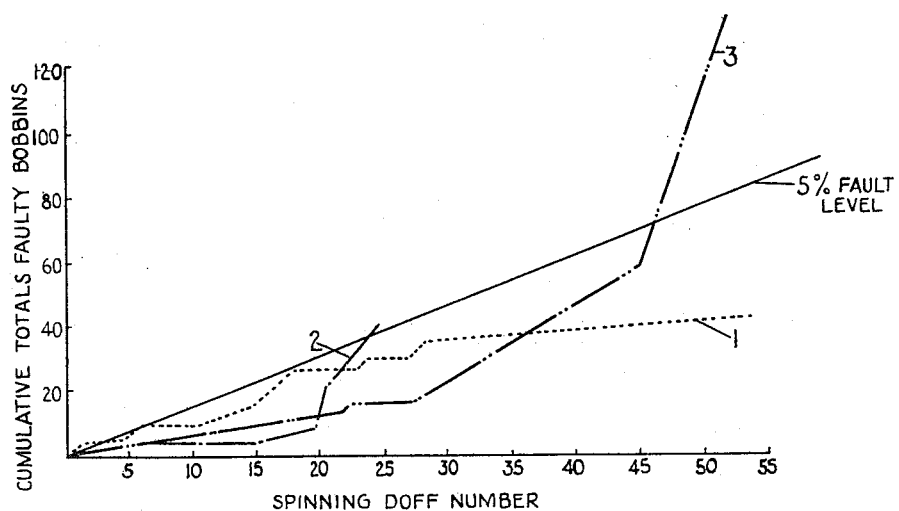

William Nicol Broatch and Thomas William Liddle, Harrogate, England, and Kenneth John Brimley, Troon, Scotland, assignors to Imperial Chemical Industries Limited, London, England, a corporation of Great Britain
Filed Jan. 30, 1962, Ser. No. 169,730
Claims priority, application Great Britain, Jan. 30, 1961, 3,439/61
5 Claims. (Cl. 260—29.1)

This invention relates to an improved melt spinning process for the production of filaments from polymers.

In the production of melt spun filaments of polyesters of aromatic dicarboxylic acids such as polyethylene terephthalate, the dry polymer, usually in the form of chips, or granules is passed to a melting zone from whence it is forwarded by means of, for example, gear pumps to a filter pack and spinneret.

Filaments produced in this way are subsequently stretched to about four times their original length after which treatment they are suitable for use in textile processes either in the form of continuous filaments or, after crimping and cutting, staple fibre.

A persistent difficulty in the stretching process of melt spun filaments is the break down of some or all of the filaments in the moving threadline due to slight faults and imperfections in the spun filaments. One important cause of these imperfections is small quantities of foreign matter that collect near the edges of the spinneret holes during spinning and occasionally become entrapped by the extruding filaments.

To overcome this cause it is common practice to clean periodically the spinneret face. This is done by stopping the melt spinning process and wiping the contaminated spinneret, for example, with a brass chisel coated with silicone grease or oil. This remedy is not economical and by no means completely successful.

It is an object of our present invention to provide a melt spun filament which may be stretched on a draw frame with a significantly reduced number of breaks and laps.

According to our invention we provide a process for manufacture of melt spun yarn of improved quality from filaments of polyesters of aromatic dicarboxylic acids wherein the polyesters are melted and extruded through a spinneret characterised in that the molten polymer before extrusion contains not more than 0.5% of a stable non-reactive non-compatible high boiling substance. In the case of organopolysiloxane fluids a useful range of activity is 0.05 to 0.2%.

Examples of stable non-reactive non-compatible high boiling substances are polytetrafluoroethylene and fluids of organopolysiloxanes. We have found that the latter are particularly suitable. In the case of the organopolysiloxane fluids a wide variety thereof may be used. Thus they may vary in viscosity up to about 300 centistokes at 100° F. if to be incorporated in polymer chips and, if to be incorporated in the reaction mixture during preparation of the polymer, up to 10,000 centistokes or higher at 100° F. They may contain a wide variety of organo groups and preferably should not contain any silicon-bonded hydrogen atoms. The organo groups may be alkyl, aryl, substituted alkyl, substituted aryl, alkaryl, aralkyl or alkenyl groups. Suitable groups include methyl, octyl, phenyl, gamma-trifluoro-propyl, gamma-cyano-propyl, tetrachlorophenyl, vinyl, and allyl groups. Dimethylpolysiloxanes are, however, preferred. The organopolysiloxane fluids may be entirely linear or may have a small amount of cross-linking, for example, up to about 10 percent of the silicon atoms may be cross-linked. They may also be end-stopped if desired, for example, with trimethylsilyl groups.

The stable non-reactive non-compatible high boiling substance may be added to the polymer in any suitable way and we have found that a satisfactory admixture may be obtained by tumbling dried polymer chip with a slight excess of said substance or by addition of the said substance to the reaction mixture during preparation of polymer.

The process of our invention is suitable for all filament forming thermoplastic polyesters and copolyesters of aromatic dicarboxylic acids and particularly polymers such as the condensation products of ethylene glycol with terephthalic acid, ethylene glycol with a mixture of terephthalic/5 (sodium sulpho) isophthalic acids, ethylene glycol with a mixture of terephthalic acid and isophthalic acid, ethylene glycol with terephthalic acid and another dibasic acid such as sebacic or adipic acid or a hydroxy carboxylic acid such as parahydroxy benzoic acid present in small amounts and polyesters of terephthalic acid with a glycol other than ethylene glycol such as 1:4 bis (hydroxymethyl) cyclohexane.

The following examples illustrate but do not limit our invention.

Example 1

Of two identical 200 lb. batches of dried polyethylene terephthalate chips, one batch was tumbled with trimethylsilyl end-stopped dimethylpolysiloxane fluid of viscosity 300 centistokes at 100° F. until it had acquired 0.1% by weight and the other was untreated. Both batches were used to produce melt spun yarns of 50 drawn denier and 24 filaments. The face of the spinneret through which the treated polymer was extruded showed no contamination whilst contamination appeared on the other spinneret.

During drawing at a draw ratio of 4:1 the spun yarn from the untreated polymer gave five times as many breaks and laps as the yarn from the treated polymer.

Example 2

Of three identical 2000 pound batches of dried polyethylene terephthalate chips the first was tumbled for one hour with 0.1% of its weight of polydimethylsiloxane, the second was tumbled for one hour with 0.01% of its weight of the dimethylpolysiloxane used in Example 1 and the third was untreated. Each batch was used to produce melt spun yarns of 50 drawn denier and 24 filaments under identical conditions. The number of faulty bobbins obtained during the drawing process was observed for each of the three batches. In FIG. 1 are shown the change in cumulative totals of faulty bobbins with spinning doff number. It can be seen that for the batch of polymer containing 0.1% dimethylpolysiloxane there is no sudden increase in the cumulative total of faulty bobbins (Graph 1) as is seen for the other two batches of polymer (Graphs 2 and 3).

Example 3

Three batches of polyethylene terephthalate were prepared by the reaction of 194 parts of dimethyl terephthalate with 139.5 parts of ethylene glycol under ester interchange conditions in presence of 0.07 part of calcium acetate as catalyst to give bis (β-hydroxyethyl)terephthalate, addition of 0.037 part of phosphorous acid, 0.04 part of antimony trioxide and 0.5 part of titanium dioxide in that order and continuing the reaction under polycondensation conditions to give polyethylene terephthalate. In the first batch no further addition was made, in the second batch a trimethylsilyl end-stopped dimethylpolysiloxane of viscosity 100,000 centistokes at 100° F. (0.1 part) was added after the antimony trioxide and before the titanium dioxide and in the third batch 0.2 part of dimethylpolysiloxane were added at the same stage.

Each of the three batches of polymer was spun under the same conditions and then drawn under the same conditions. During the drawing stage a count was made of the bobbins in which laps were observed and in which breaks occurred. The results were as follows:

|  | Batch 1 | Batch 2 | Batch 3 |
|---|---|---|---|
| 2 lapped bobbins | 5.3 | 3.2 | 0.3 |
| 2 break bobbins | 1.0 | 0.8 | 0 |

What we claim is:

1. A process for the manufacture of melt spun yarn of improved quality from filaments of a polyester of an aromatic carboxylic acid and an alcohol wherein the polyester is melted and extruded through a spinneret characterised in that the molten polymer before the extrusion contains from about 0.05% to 0.5% of a stable organopolysiloxane fluid.

2. A process according to claim 1 wherein the organopolysiloxane fluid is a dimethylpolysiloxane.

3. A process according to claim 2 in which the dimethylpolysiloxane is present in an amount from 0.05% to 0.2%.

4. A process according to claim 3 wherein the polyester of an aromatic dicarboxylic acid is a polyester derived from terephthalic acid.

5. A process according to claim 4 wherein the polyester derived from terephthalic acid is polyethylene terephthalate.

References Cited by the Examiner

UNITED STATES PATENTS 3,014,011   12/61   Zoetbroad _____ 260—75

MORRIS LIEBMAN, *Primary Examiner.*